United States Patent
Terashi et al.

(10) Patent No.: US 7,918,963 B2
(45) Date of Patent: Apr. 5, 2011

(54) METHOD AND APPARATUS FOR ADHERING PARTS MAINTAINING ADJUSTED POSITION

(75) Inventors: Taroh Terashi, Machida (JP); Hisayoshi Ohshima, Sagamihara (JP); Yuusuke Taneda, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 595 days.

(21) Appl. No.: 10/666,235

(22) Filed: Sep. 19, 2003

(65) Prior Publication Data
US 2004/0129382 A1 Jul. 8, 2004

(30) Foreign Application Priority Data
Sep. 20, 2002 (JP) .................................. 2002-276294

(51) Int. Cl.
*B29C 65/00* (2006.01)
(52) U.S. Cl. .................. 156/275.5; 156/273.3
(58) Field of Classification Search ............... 156/273.3, 156/275.5, 272.2
See application file for complete search history.

(56) References Cited

U.S. PATENT DOCUMENTS

| | | | |
|---|---|---|---|
| 5,318,653 A * | 6/1994 | Toide et al. | 156/295 |
| 6,000,784 A * | 12/1999 | Takemoto et al. | 347/50 |
| 6,302,512 B1 | 10/2001 | Ikegame et al. | |
| 6,596,104 B1 * | 7/2003 | Tomiyama | 156/64 |
| 2002/0134515 A1 * | 9/2002 | Yamaguchi et al. | 156/379.6 |
| 2003/0006004 A1 * | 1/2003 | Fujioka et al. | 156/275.7 |
| 2004/0111913 A1 * | 6/2004 | Holmes | 34/259 |
| 2004/0246884 A1 * | 12/2004 | Komaki et al. | 369/288 |

FOREIGN PATENT DOCUMENTS

| | | |
|---|---|---|
| JP | 9-296155 | 11/1997 |
| JP | 11-101934 | 4/1999 |
| JP | 11-188874 | 7/1999 |
| JP | 11-291539 | 10/1999 |
| JP | 11291539 A * | 10/1999 |

OTHER PUBLICATIONS

Machine Translation of JP 11291539 A, Oct. 14, 2009.*
Official action (and English translation thereof) in connection with a counterpart Japanese patent application No. 2002-276294.

* cited by examiner

*Primary Examiner* — Richard Crispino
*Assistant Examiner* — Daniel McNally
(74) *Attorney, Agent, or Firm* — Cooper & Dunham LLP (57) ABSTRACT

An apparatus maintaining adjusted positions of parts assembled by adhering includes a device coating plural sections between a part and an adhering target with light energy curable adhesives adhering the part to the adhering target, a light energy irradiating device for curing the adhesive, and a detecting device detecting a displacement of the part from the adhering target. A curing shrinkage force control device is also provided to control the light energy irradiating device to change the light and thus control curing shrinkage forces to offset undesirable stresses generated by the curing shrinkage forces when undesirable displacement is detected.

4 Claims, 8 Drawing Sheets

METHOD AND APPARATUS FOR ADHERING PARTS MAINTAINING ADJUSTED POSITION

FIELD

The present specification relates to a method and apparatus for positioning and adhering an adhering member to an adhering target using light energy curable type adhesive.

BACKGROUND

When parts are adhered, a heat curable type, an anaerobic curable type, a light curable type (e.g. ultra violet light or visible light), and combined type of adhesives are typically utilized. Among those, when the heat curable type adhesive is utilized to adhere optical parts, a heating process using an oven or similar is needed. As a result, the process generally takes relatively long time. In addition, some parts may not be heat resistant. When the anaerobic curable type adhesive is utilized, there are other restrictions due to characteristics of its curing process.

In view of such problems, ultra violet light curable type adhesive is generally utilized when parts (e.g. optical parts) are adhered. However, despite various advantages such as a quick action, a wide range adhering process, etc., the light curable type adhesives pose challenges due to shrinkage when cured with light (e.g. ultra violet light).

Such curing shrinkage is a serious problem when assembling is precisely performed. Specifically, a precise relative position can be disrupted due to curing shrinkage. Thus, curing shrinkage possibly impedes precision assembling.

As a countermeasure, four general types of methods are used. A first method suppresses curing shrinkage by thinning and decreasing an amount of adhesive to be coated as discussed in Japanese Patent Application Laid Open Nos. 2000-90481 and 10-309801. Japanese Patent Application Laid Open No. 2000-90481 discusses decreasing viscosity and pressure in order to uniformly coat a thin, low viscosity adhesive layer, so that a change in a volume of the adhesive, which is caused by a chance in temperature and curing shrinkage of the adhesive, can be slight and uniform. Japanese Patent Application Laid Open No. 10-309801 employs an intermediate hold member between an adhering member and adhering target to allow an adjustment margin. Thus, a thin adhesive layer is formed, so that a change in a volume of the adhesive, caused by curing shrinkage and a change in temperature, can be minimized.

However, Japanese Patent Application Laid Open No. 2000-90481 refers to a surface adhesion type and thereby needs special adhesive. Further, since Japanese Patent Application Laid Open No. 10-309801 restricts an adhesion structure and should employ indirect adhesion, the process needs additional parts and thereby undesirably increases the number of adhesion sections.

A second method improves uniformity of curing shrinkage by controlling irradiation of UV light and suppressing unevenness thereof as discussed in Japanese Patent Application Laid Open No. 2001-350072. Specifically, the proposal is to perform adhesion while maintaining a surface precision originally existing in optical parts by detecting unevenness of UV light intensity, and controlling a transmission light control section to suppress the unevenness so that uniformity of the curing shrinkage can be improved. However, in this method the adhesion process is restricted to a surface adhesion type, and displacement caused by curing shrinkage tends to unavoidably occur when adhesive is unevenly coated.

A third method suppresses displacement of parts caused by curing shrinkage by designing an adhesion structure and a process as discussed in Japanese Patent Application Laid Open No. 08-209075. However, this method also restricts an adhesion structure and is not a highly precise multipurpose UV adhering method.

Japanese Patent Application Laid Open No. 08-209075 designs structures of an adhering member, an adhering target, and an adhesion section, and then cures adhesive starting from that in the vicinity of two members simultaneously with coating so that a relative position between the two members would not be greatly affected by the curing shrinkage.

A fourth method, most widely employed, changes composition of the adhesive itself, as discussed in Japanese Patent Application Laid Open Nos. 10-121013, 07-201028, and 05-041408. Specifically, a technology of adding fine ceramic particles or filler to an adhesive so as to minimize its curing shrinkage has been known. Also known is a technology of adding thermal shrinkage plastic to affect curing times and shrinkage. In particular, Japanese Patent Application Laid Open No. 10-121013 adds filler having constant particle diameter and density so that a change in a volume of the adhesive caused by curing shrinkage and a change in temperature can be minimized. Japanese Patent Application Laid Open No. 07-201028 adds oxide ceramic fine particle average particle diameter no more than 10 micrometers in order to suppress a change in a volume caused by a change in temperature as well as curing shrinkage of the adhesive itself. Japanese Patent Application Laid Open No. 05-041408 employs ultra violet light curable type plastic including thermo shrinkage plastic and controls respective times when adhesive is cured by irradiation of ultra violet light and when shrinkage occurs due to heat so as to maintain the relative positions of the parts being bonded.

However, in such a situation, particular adhesive is required. Further, when the amount of adhesive is increased, the curing shrinkage correspondingly increases, thereby undesirable displacement of parts increases.

SUMMARY

Accordingly, an object of the present disclosure is to address and resolve the above and other problems and provide a adhering process and apparatus that can adjust and/or maintain the positions of parts being adhered. Such improved apparatus includes a coating device that coats plural sections between a part and an adhering target with light energy curable adhesives operative to adhere the part to the adhering target, a light energy irradiating device that irradiates light energy and cures the light curable adhesive, and a detecting device that detects displacement between the part and the adhering target. A curing shrinkage force control device is provided to control the light energy irradiating device so as to change the light so that curing shrinkage forces generated at the plural sections and applied to the adhering part and target can be even, and so that stresses generated by the curing shrinkage forces can be offset when undesirable displacement is detected by the detecting device.

In another embodiment, the light energy irradiating device changes the light in order to change at least one of the curing shrinkage forces so that one of an amount and a direction of at least one of the stresses can be changed.

In still another embodiment, a feedback device is provided to feed back detection result to a light energy irradiating device controller to change the light so that a relative position of the part and the adhering target can be adjusted.

In still another embodiment, an activation control device is provided to selectively activate the light energy irradiating device in accordance with displacement detected by the detecting device to change at least one of the curing shrinkage forces so that one of an amount and a direction of at least one of the stresses can be changed.

In still another embodiment, an irradiation intensity control device is provided to change the light energy in accordance with displacement detected by the detecting device to change at least one of curing shrinkage forces so that one of an amount and a direction of at least one of the stresses can be changed.

In still another embodiment, an irradiation area control device is provided to change an irradiation area of the light energy in accordance with displacement detected by the detecting device to change at least one of curing shrinkage forces so that one of an amount and a direction of at least one of the stresses can be changed.

In still another embodiment, one of an amount and a direction of at least one of said stresses is changed by providing plural light energy curable type adhesives having different shrinkage characteristics to at least one of the curing sections.

In still another embodiment, one of an amount and a direction of at least one of said stresses is changed and differentiated from other stresses by providing a different amount of the light energy curable adhesive to at least one of the curing sections.

Instill another embodiment, one of an amount and a direction of at least one of said stresses is changed by coating light energy curable adhesive in a different shape at least at one of the plural sections.

BRIEF DESCRIPTION OF THE DRAWINGS

A more complete appreciation of the present teaching and many of the attendant advantages thereof will be readily obtained as the same becomes better understood by the following detailed description when considered in connection with the accompanying drawings, wherein.

DESCRIPTION OF THE PREFERRED EMBODIMENT

Referring now to the drawings, wherein like reference numerals and marks designate identical or corresponding parts throughout several views. The present teaching can employ light energy curable adhesive such as light curable type adhesive (e.g. UV curable type adhesive, and visible light curable type adhesive), radiation curable type adhesive, x-ray curable type adhesive, etc. However, an example described herein below uses the UV curable type adhesive as one example of a light curable type adhesive.

In general, when an adhering member is adhered to an adhering target using UV curable type adhesive, such adhesive is coated on faces of the two members (i.e., an adhering member and adhering target). A UV light is then irradiated thereto in order to cure such adhesive. During the curing, conventional acrylic plastic adhesive can shrinks by 10%, and conventional epoxy plastic adhesive by 5%, respectively. Thus, when such adhesive is coated on plural sections, such shrinkage also occurs at plural adhesion sections. Such curing shrinkage generates stress drawing the adhering members to each other.

As described later in more detail, the present teaching avoids or reduces displacement caused by adhesion performed after positional adjustment, and enables extremely high precision adhesion by controlling curing energy and changing and offsetting curing shrinkage forces generated in adhesive. Further, the present teaching enables extremely highly precise adhesion by positively using a curing shrinkage force in moving an adhering member, and changing and offsetting the curing shrinkage force after performing very little positional adjustment.

Figure 1:
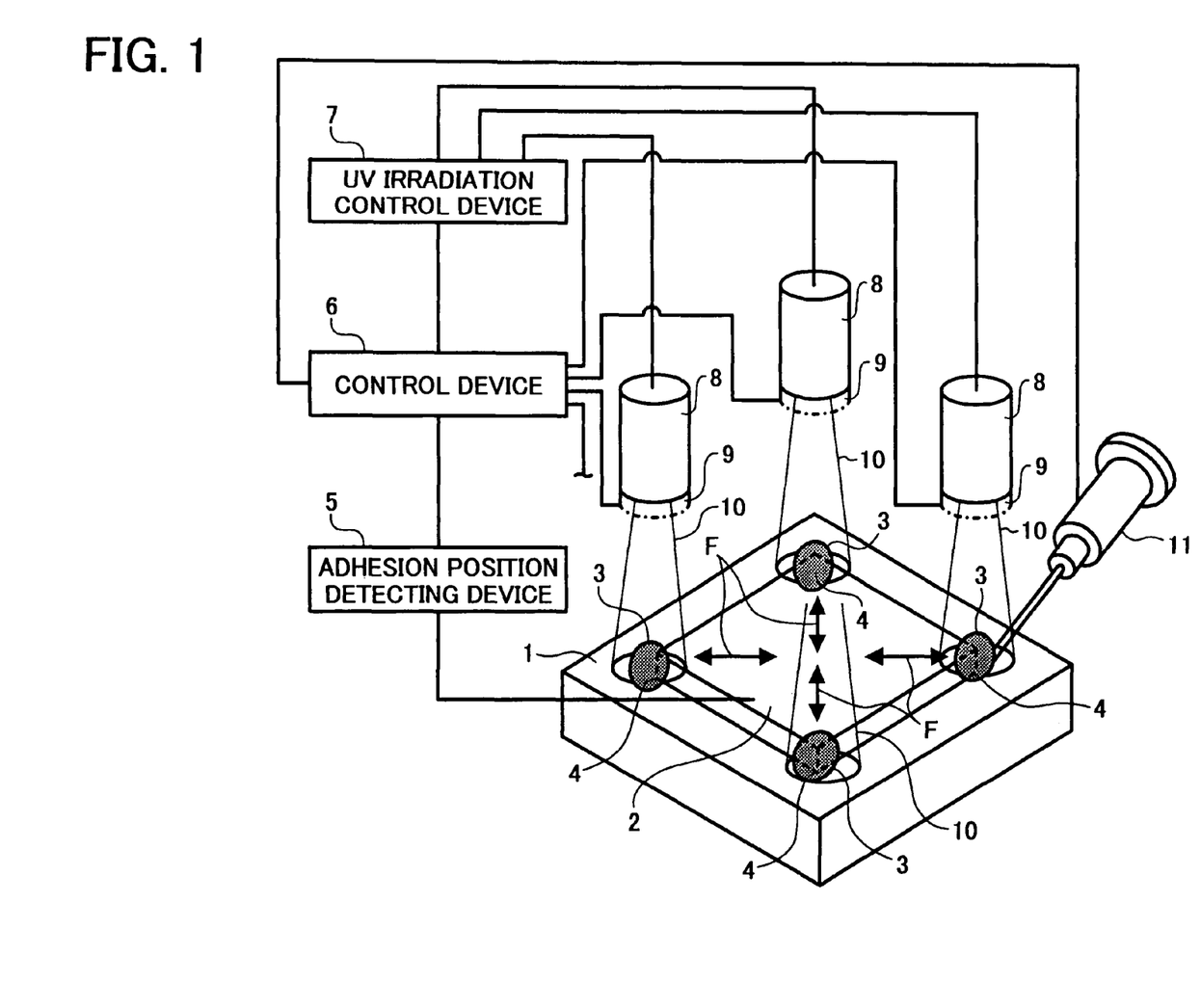
FIG. 1 illustrates an exemplary adjusted position maintainable parts adhering apparatus according to the first embodiment.

Specifically, as shown in FIG. 1, in an adjusted position maintainable parts adhering apparatus, an adhering member 1 adheres to an adhering target 2 with light energy curable type adhesive, for example UV curable type adhesive 3, via a plurality of curing sections 4. Such an adjusted position maintainable parts adhering apparatus includes an adhering member position detecting device 5 detecting a relative position between the adhering member and target 2 and 1, a control section 6 having a feedback control device (e.g. implementing a control algorithm), a UV irradiation control device 7 controlling a UV light 10 to the plurality of curing sections 4, a UV light irradiation device 8, an irradiation energy changing device 7, and an adhesive coating device 11. The symbol "F" represents an amount and direction of stress generated in the adhering member 2 by shrinkage of the adhesive.

The adhering target 1 is formed from an optical base such as a glass plate, a ceramic plate, a metal plate, etc. The adhering member 2 is formed from an optical element such as a lens, a diffraction grating, etc, and an optical parts such as a light receiving unit, a light generating element, a solid state imaging element (e.g. CCD), etc.

As shown in FIG. 1, four sections on which the UV curable type adhesives 3 are coated correspond to the above-mentioned four curing sections 4, respectively. However, the plural curing sections 4 can be included in only one section of UV curable type adhesive 3, for example, when the plural UV curable type adhesives 3 of FIG. 1 are continuously formed in a rectangular bead.

Figure 2A:
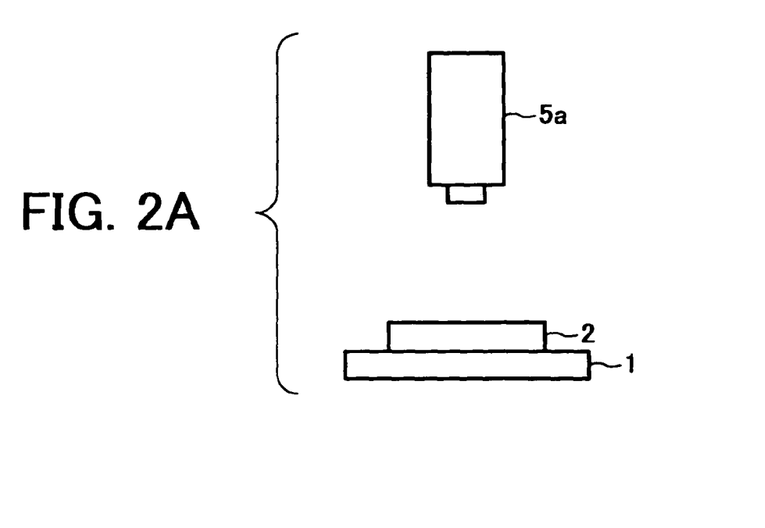
FIGS. 2A and 2B collectively illustrate a position detecting device employed in the adjusted position maintainable parts adhering apparatus of FIG. 1 so as to detect a position of a parts.
Figure 2B:
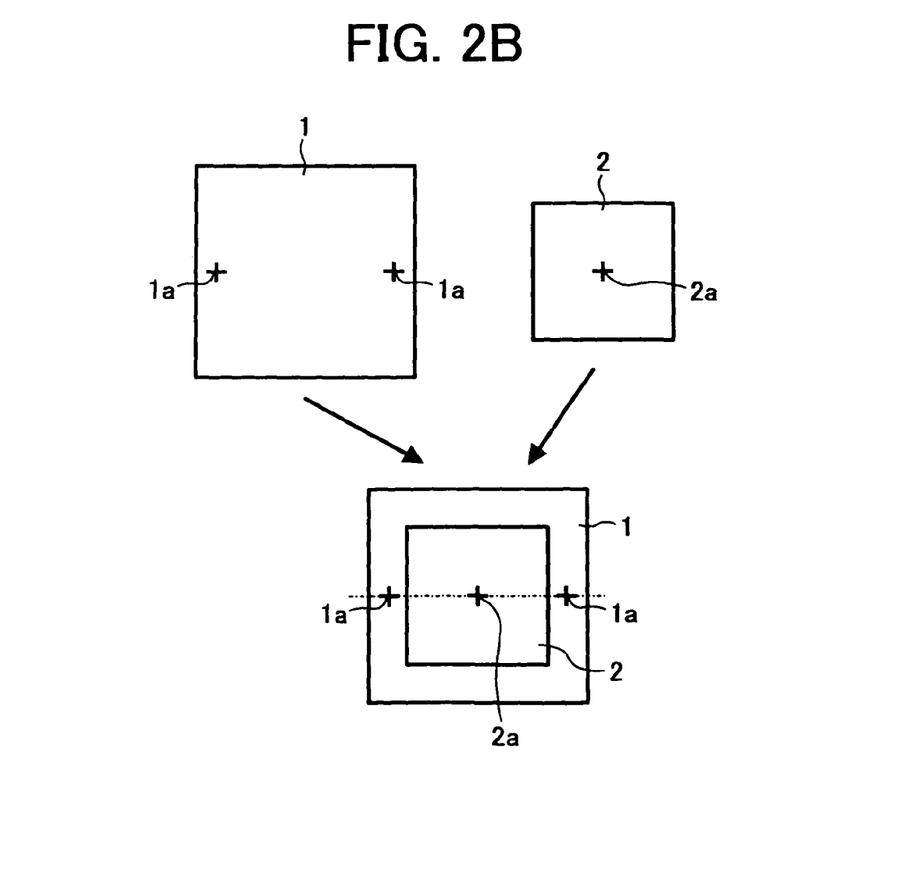

A position detecting device 5a serving as an adhering member position detecting device 5 is now described with reference to FIGS. 2A and 2B. The position detecting device 5a such as a CCD detects a relative position between the adhering target and adhering member 1 and 2. Specifically, an alignment marks 1a and 2a are previously formed on the adhering target 1 and the adhering member 2, respectively. As shown in FIG. 2A, the position detecting device 5a takes a picture of a position of the adhering member 2 from above. Then, a position of the adhering target 2 is detected and displacement between the adhering member and target 2 and 1 is recognized so that these alignment marks 1a and 2a can be adjusted to a position on the same line and the alignment mark 2a can be positioned at a mid point between the pair of alignment marks 1a in accordance with the recognition.

Figure 3A:
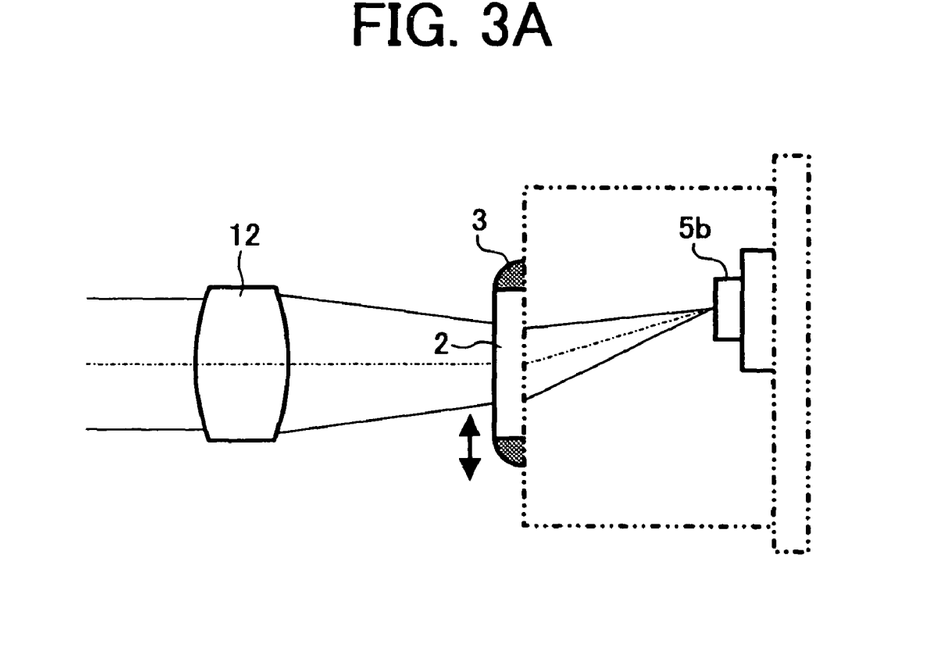
FIGS. 3A and 3B collectively illustrate another type of a position detecting device.

As shown in FIG. 3A, when an adhering member 2 includes a diffraction grating or a lens or the like, a position detecting device 5b of a photo acceptance unit or the like detects a position of the adhering member 2, serving as the adhering member position detecting device 5, in accordance with an optical signal generated when a light is transmitted through the adhering member 2 and is received by a two-division or a four-division photo receptor unit or the like. Further, when an adhering member 2 includes a mirror or the like, its position is similarly detected if a light is reflected and received from the adhering member 2 by a photo receptor unit, and an optical signal generated by the photo receptor unit is detected.

Figure 3B:
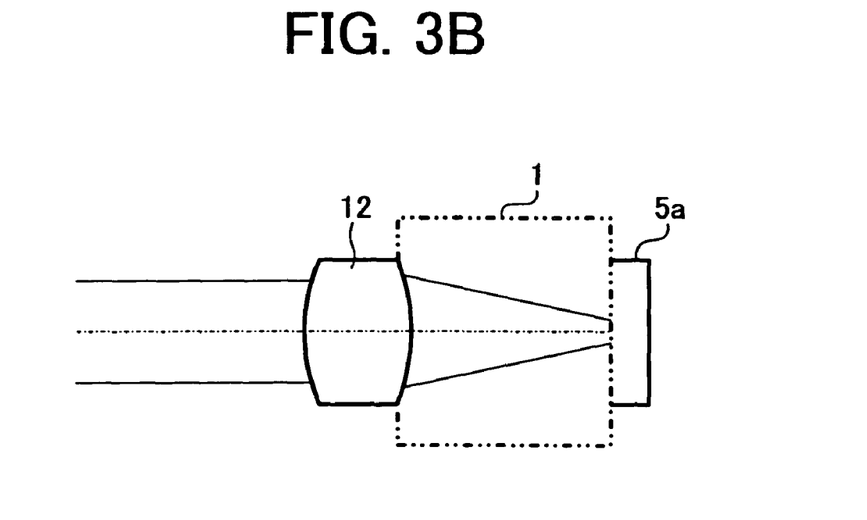

Further, as shown in FIG. 3B, when the adhering member 2 includes a lens 12, its position can be detected in accordance with a spot radius, an MTF, and similar, if a CCD or the like is arranged in the vicinity of a focal point of the lens 12, by a position detecting device 5a.

Referring back to FIG. 1, the UV irradiation control device 7 performs various functions, including individually turning the UV irradiation device 8 ON and OFF, changing an irradiation receiving section, separately controlling irradiation intensity, and separately controlling an irradiation area, as needed.

Figure 10:
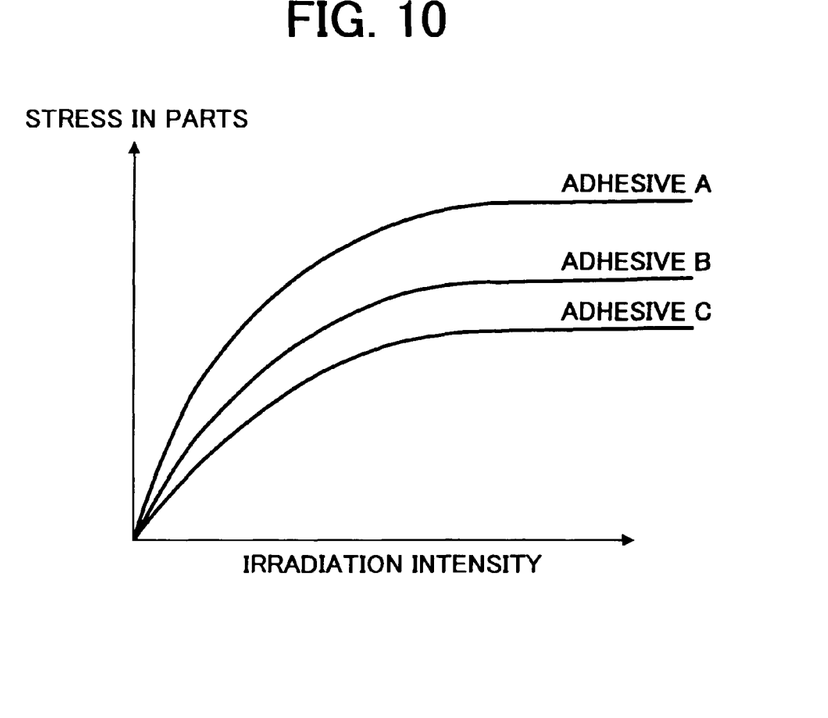
FIG. 10 illustrates dependence of stress generated in parts to irradiation intensity at a time of curing.

As shown in FIG. 10, since when light energy is accumulated, more stress is generated in the parts, when the irradiation intensity is greater, the curing of the adhesive progresses further and more stress is generated in the parts. In contrast, the less the irradiation intensity, the less the curing progresses.

Figure 11:
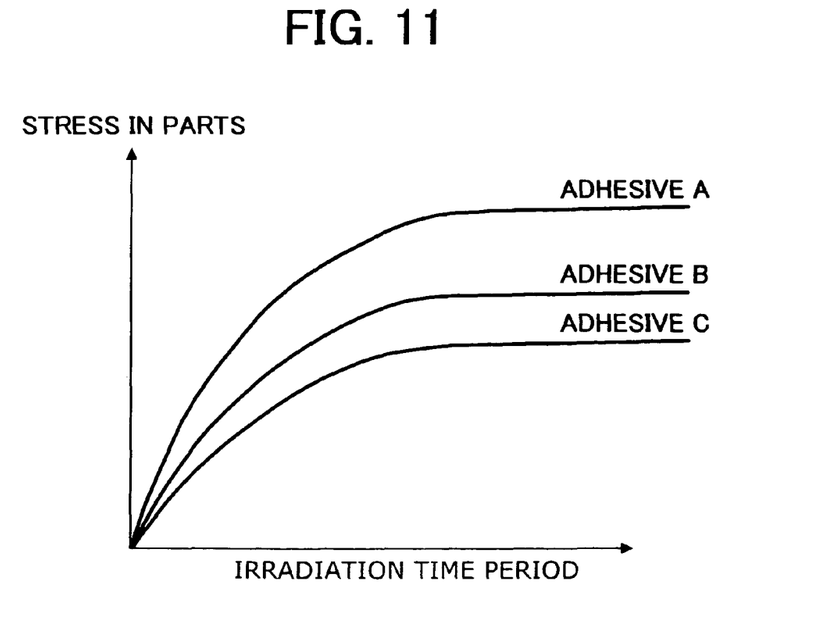
FIG. 11 illustrates dependence of stress generated in parts to an irradiation time period of curing.

As shown in FIG. 11, since when more light energy is accumulated, more stress is generated in the parts, the curing of the adhesive progresses and the stress increases with increase in irradiation time at an irradiation activated (ON) section. In contrast, curing does not progress at an irradiation deactivated (OFF) section.

Figure 12:
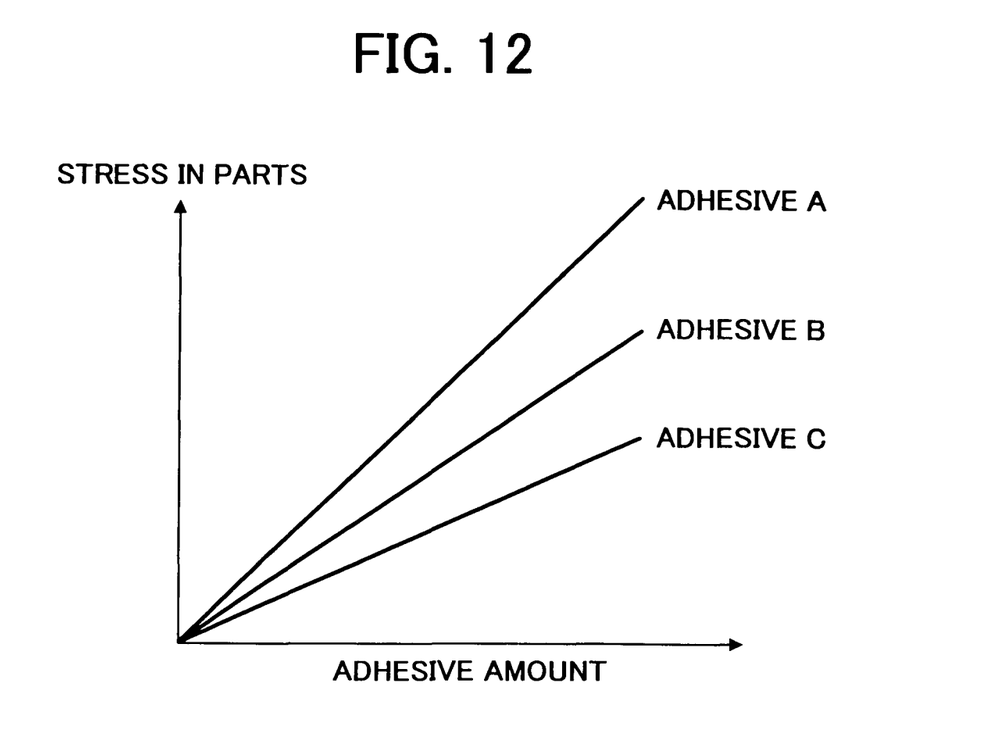
FIG. 12 illustrates dependence of stress generated in parts to an adhesive amount at curing.

As shown in FIG. 12, when the amount of adhesive is less, less curing shrinkage force and stress are generated in the parts, so the amount of curable adhesive can be changed by changing an irradiation area. Specifically, by increasing an irradiation area and/or intensity at a side where stress is to be increased, and decreasing an irradiation area and/or intensity at a side where stress is to be decreased each in accordance with position detection information obtained by the adhering member position detecting device 5, the adhering member 2 can maintain its original or desired position as described later with reference to a first embodiment. Further, the adhering member 2 can optionally be moved as described later with reference to a second embodiment.

Referring back again to FIG. 1, the UV light irradiation device 8 includes a UV light source (not shown) irradiating a light for curing a UV curable type adhesive 3, a reflection mirror (not shown) reflecting a UV light 10 irradiated from the UV light source, an optical fiber (not shown) guiding the reflected UV light 10, a condensing lens or divergence lens (not shown) irradiating the guided UV light 10 to a curing section 4, and an irradiation energy changing device 9, for example. The irradiation energy changing device 9 includes an irradiation area changing device (not shown) such as a mask changing an irradiation area or an irradiation intensity changing device (not shown) such as a filter changing irradiation intensity. A density (i.e., a transmission light amount) changeable filter (not shown) can adjust a transmission light amount to serve as an irradiation intensity changeable device. When a liquid crystal is utilized therefor, the transmission light amount can be adjusted by adjusting voltage. Further, a device capable of mechanically adjusting the transmission light amount by rotating a filter can be employed. Further, a polarization axis can be inclined by combining with a polarization filter. Further, a UV lamp capable of changing intensity in accordance with program is coming onto the market, and can be employed. Also coming onto market is a device capable of narrowing down a light entering into a fiber from a reflecting mirror. Further, irradiation light of a light source can directly electrically be controlled.

The adhesive coating device 11 includes an applicator such as and other known devices for coating the UV curable type adhesive 3 for adhering the adhering member 2 to the adhering target 1, and a syringe moving device moving the syringe (not shown). Further, a device capable of coating various types of adhesive can be employed as an adhesive coating device 11. A device capable of coating an optional amount of adhesive can also be employed. Also employable is a device capable of coating adhesive in various shapes.

Figure 4:
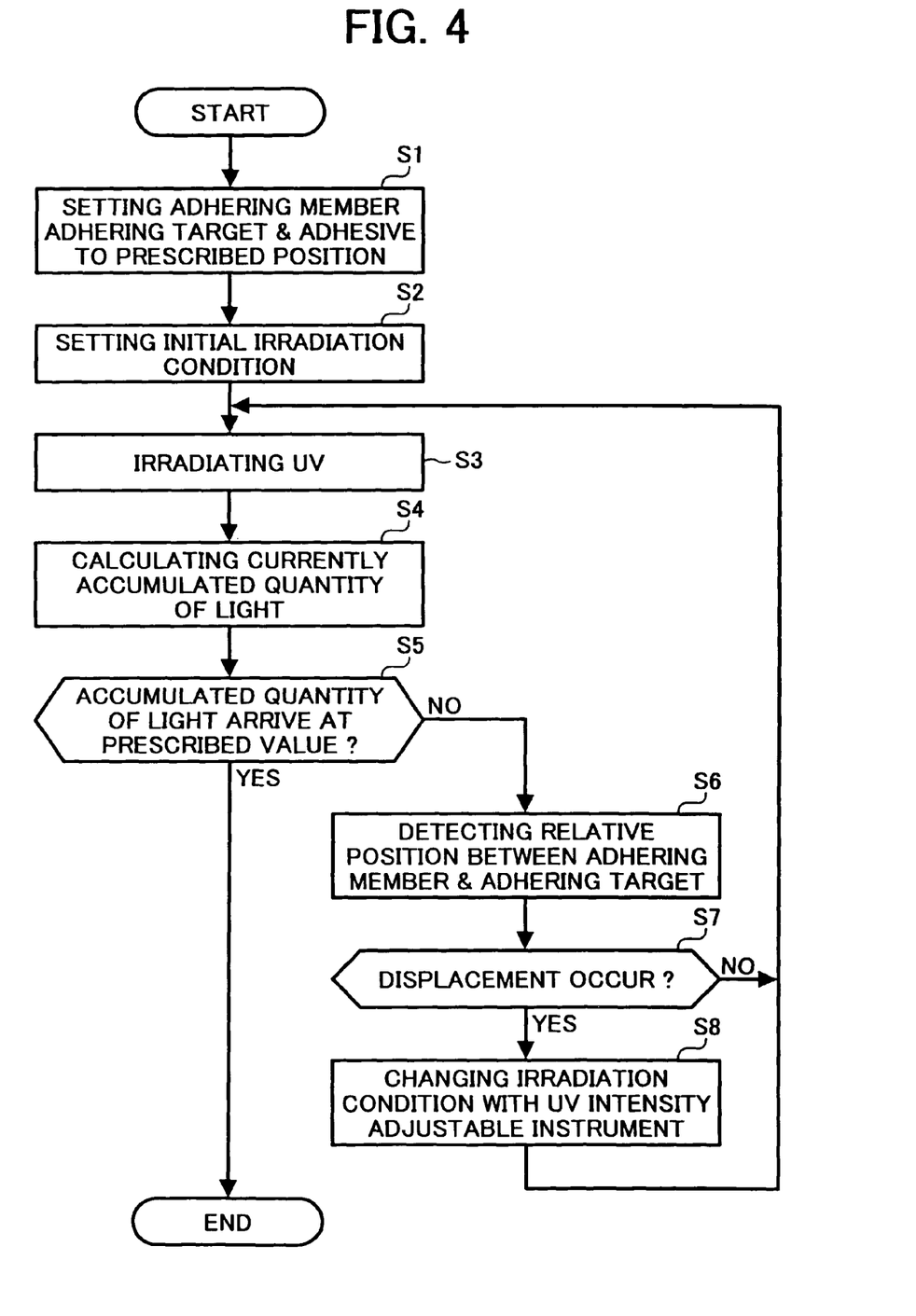
FIG. 4 illustrates a flow chart of a process executed by a control section employed in the adjusted position maintainable parts adhering apparatus of FIG. 1.

A flow chart of a controlling process executed by a general control section (not shown) employed in the adjusted position maintainable parts adhering apparatus of FIG. 1, is now described with reference to FIG. 4. The above-mentioned control device 6 includes a feedback control device (e.g. a control algorithm) controlling irradiation of a UV light in accordance with detected displacement information. Initially, respective adhering member and target 2 and 1 and UV curable type adhesive 3 are adjusted and set to prescribed positions (in step S1). Then, an initial irradiation condition is set (in step S2). Then, the UV curable type adhesive 3 is irradiated to prescribe one or more curing sections 4 (in step S3). Then, a presently accumulated amount of light energy is calculated (in step S4). Then, the accumulated and calculated light amount is compared to determine if it has reached at a preset accumulation light amount capable of completing curing (in step S5). If the answer is "No" (in step S5), a relative position between the adhering member and target 2 and 1 is detected (in step S6). Then, it is determined if a prescribed amount of displacement exists in accordance with detection information obtained in step S6 (In step S7). If the answer is "No" (in Step S7), the process returns to step S3. In contrast, if the answer is "Yes", an irradiation condition is changed (in step S8). The irradiation condition changing is performed by biasing intensity using a UV intensity changeable instrument (e.g. a filter) serving as an irradiation energy changeable device 9, for example.

Figure 5A:
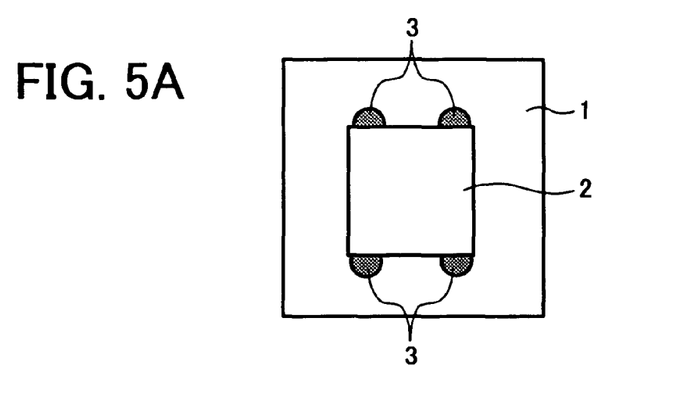
FIGS. 5A and 5B collectively illustrate mound type adhesion as one example of adhering.
Figure 5B:
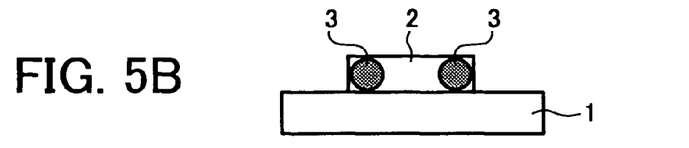

An exemplary adhering process adhering an adhering member 2 to an adhering target 1 is now described with reference to FIGS. 5 to 9. An adhesion process called mound type adhesion is illustrated in FIGS. 5A and 5B, in which UV curable type adhesive 3 is coated after positional relation between the adhering member and target 2 and 1 is determined. An adhering force of this mound type adhesion is not very high. However, since ends of the adhering member 2 are adhered, the mound type adhesion is efficient when a coating surface of the adhering member 2 contacting the adhering target 1 is restricted, for example.

Figure 6A:
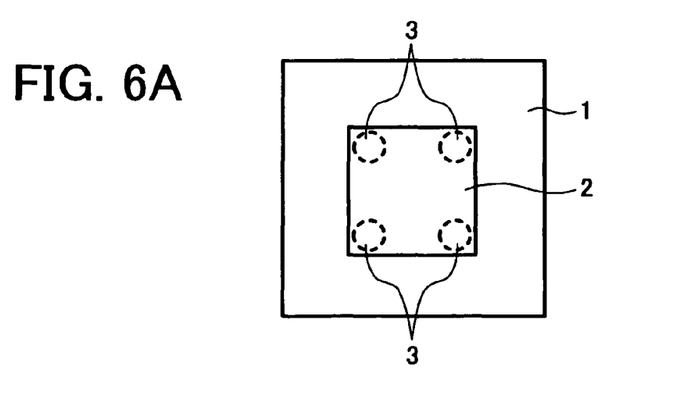
FIGS. 6A and 6B collectively illustrate surface type adhesion as another example of adhering.
Figure 6B:
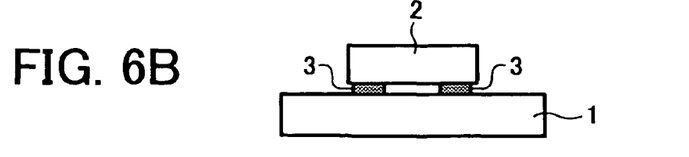

An adhering process called surface adhesion is now described with reference to FIGS. 6A and 6B. The UV curable type adhesive 3 is coated on one of the adhering target and member 1 and 2, and the other is relatively positioned. An adhering force of the surface adhesion is remarkably high.

Figure 7A:
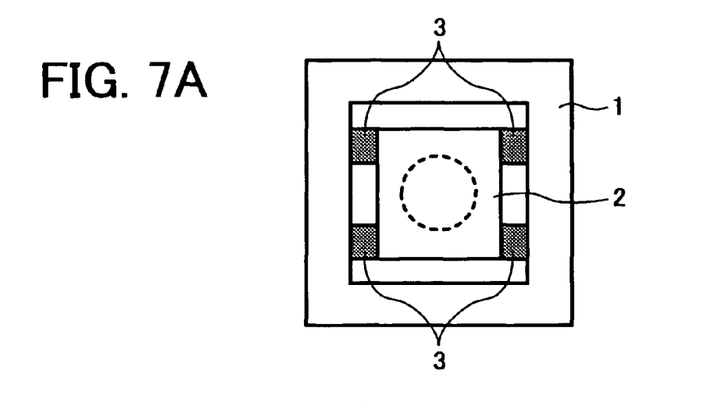
FIGS. 7A and 7B illustrate filling type adhesion as still another example of adhering.
Figure 7B:
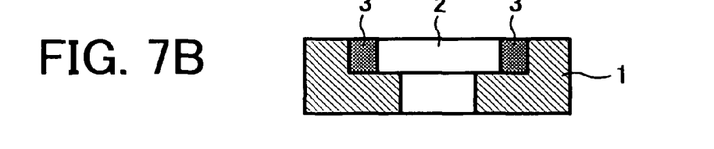
Figure 9:
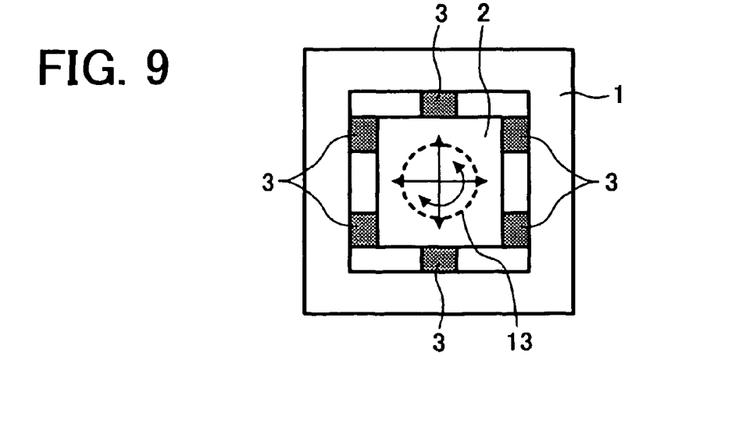
FIG. 9 illustrates a still another example capable of three dimensionally adjusting position of parts.

An adhesion process called filling adhesion is now described with reference to FIGS. 7A and 7B. Similar to the mound type adhesion of FIGS. 5A and 5B, a UV curable type adhesive 3 is coated after a positional relation between the adhering target and member 1 and 2 is determined. While an adhering force of such filling adhesion is not very high, this process is efficient when a coating surface between the adhering target and member 1 and 2 is restricted, for example. When an adhesion manner shown in FIG. 9 is employed, three-dimensional control can be performed about X, Y, and θ axes on a surface.

Figure 8:
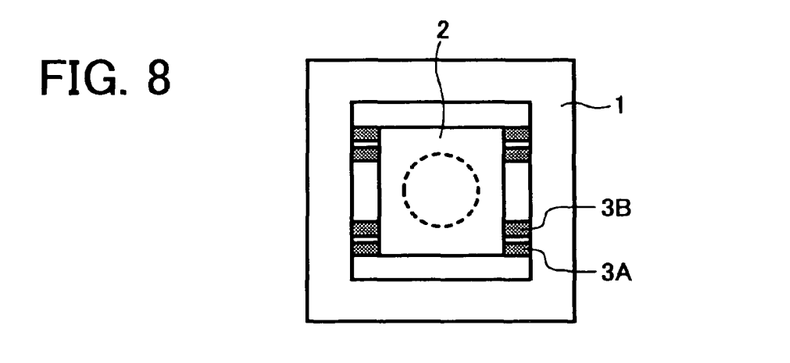
FIG. 8 illustrates adhesion using dissimilar adhesives as still another example of adhering.

Further, as shown in FIG. 8, when the adhesive coating device 11 has a function of coating various types of adhesives having different curing shrinkage amounts, since shrinkage characteristics are different depending upon the adhesive, and stress is also finally differently generated in the adhering member 2 as illustrated in FIGS. 10 to 12, the curing adhesive is alternatively selected in accordance with information obtained by the adhering member position detecting device 5, so that a position of the adhering member 2 can be maintained as described in the later mentioned first embodiment. Otherwise, the adhering member can be optionally moved as described in the later mentioned second embodiment. Thus, respective fist and second UV curable type adhesives 3A and 3B are arranged side by side at substantially the same positions to be alternatively selected.

As various types of adhesives, acrylic UV curable type adhesive (e.g. TB3033™ manufactured by Three Bond Co. Ltd, curing shrinkage amount of which is 6.7%; TB3014™ manufactured by Three Bond Co. Ltd, curing shrinkage amount of which is 9.2%), epoxy UV curable type adhesive (e.g. TB3121™ manufactured by Three Bond Co. Ltd, curing shrinkage amount of which is 4.2%), and silicon UV curable type adhesive (e.g. TB3164™ manufactured by Three Bond Co. Ltd, curing shrinkage amount of which is 0.4%), and similar types can be employed.

Figure 13:
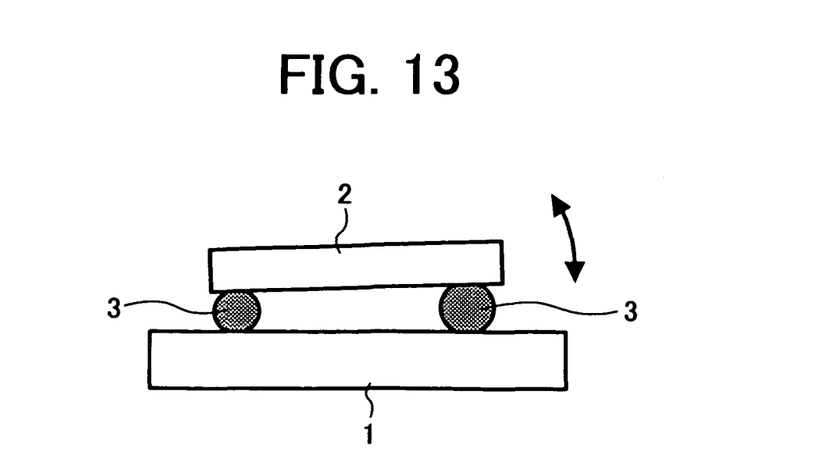
FIG. 13 illustrates an exemplary control operation for controlling correction of tilt as still another example of adhering.

Any one of these adhering manners is applicable to the embodiments as mentioned heretofore. However, when a relative position is to be very precisely achieved on the surfaces of these two members (1 and 2), the filling adhesion process shown in FIGS. 6A to 7B are preferable. When tilting of these two members is to be precisely achieved, the adhering process of FIGS. 5A and 5B is preferable. Further, as illustrated in FIG. 13, such an adhering process can also be used in adjusting an inclination of the opposing surfaces of the adhering member and target 2 and 1. Thus, an adhering process can be selected in accordance with a need.

As shown in FIG. 12, since an amount of stress applied to parts is different in accordance with an amount of adhesive, a relative potion can be changed by changeably selecting an adhesion section (or an adhesive amount) to be cured in accordance with information obtained by the position detecting device serving as an adhering member position detecting device. Specifically, an adhering member 2 can be moved over a desired distance.

As mentioned above, since there exists a readily controllable direction for parts depending upon an adhesion condition, a position can be adjusted and maintained in relation to many axes by changeably selecting an adhesion section to be cured in accordance with information obtained by the adhering member position detecting device 5. Specifically, the adhering member can be moved over a desired distance in a desired direction.

An operation of a first embodiment of an adjusted position maintainable parts adhering apparatus is now described. Initially, an adhering member 2 and target 1 are positioned at a prescribed relative position. An adhesive coating device 11 then coats the suitable surfaces of the adhering target and adhering member (1 and 2) at one or more curing sections 4 (e.g. each corner of the adhering member 2) with UV curable type adhesive 3. A UV light irradiation device 8 then irradiates a UV light to the UV curable type adhesive 3 so that the adhering member 2 can adhere to the adhering target 1. An adhering member position detecting device 5 then detects displacement of the adhering member 2 from the adhering target 1. The control device 6 then changes the UV light 10 in a prescribed manner as mentioned earlier in order to change a shrinkage force of applicable one or more UV curable type adhesives 3 in accordance with displacement information obtained by the adhering member position detecting device 5. Then, stresses generated in the adhering member 2 by the curing shrinkage forces are offset until the displacement is eliminated.

In a second embodiment, similar operations as performed in the first embodiment are executed. However, in order to offset the stresses when the displacement is detected, one of an amount and a direction of applicable stress are changed.

In a third embodiment, similar operations as performed in the first embodiment are executed. In addition, however, when the control device 6 changes the UV light 10, a feedback signal generated by the adhering member position detecting device 5 is referred to when displacement is detected.

In a fourth embodiment, similar operations as performed in the first embodiment are also executed. However, when the displacement is detected, and accordingly, applicable one or more curing forces are changed, the UV irradiation control device 7 selectively activates the UV light irradiation device 8 to irradiate the UV light to prescribed one or more UV curable type adhesives.

In a fifth modification, similar operations as performed in the first embodiment are also executed. However, when the displacement occurs, and accordingly, applicable one or more curing forces are changed, the control device 6 controls an irradiation energy changeable device 9 to individually change intensity of light energy irradiation to applicable one or more UV light curable adhesives.

In a sixth embodiment, similar operations as performed in the first embodiment are also executed. However, when the displacement is detected, and accordingly, applicable one or more curing forces are changed, applicable one or more light energy irradiation areas of the UV light to be irradiated to applicable one or more light energy curable adhesives are changed.

In a seventh embodiment, similar operations as performed in the first embodiment are also executed. However, in order to change applicable one or more curing forces when the displacement occurs, different shrinkage characteristic type adhesives such as different UV curable type adhesives 3A and 3B are previously coated on at least one of the plural curing sections 4. Then, a curing adhesive receiving the UV light is alternated by the controller 6 when the displacement occurs.

In an eighth embodiment, similar operations as performed in the first embodiment are also executed. However, in order to change applicable one or more curing forces when the displacement occurs, some or all of the UV curable type adhesive 3 is previously coated on the plural curing sections 4 in respective different amounts.

In a ninth embodiment, similar operations as performed in the first embodiment are also executed. However, in order to change applicable one or more curing forces when the displacement occurs, some or all of the UV curable type adhesives 3 previously coated on the respective curing sections 4 are in a different in kind or form from each other.

Numerous additional modifications and variations of the present invention are possible in light of the above teachings. It is therefore to be understood that within the scope of the appended claims, the present invention may be practiced otherwise than as specifically described herein.

This application claims priority under 35 USC §119 to Japanese Patent Application No. 2002-276294 filed on Sep. 20, 2002, the entire contents of which are herein incorporated by reference.

What is claimed as new and desired to be secured by letter patent of the United States is:

1. A method for adhering parts to a target with light energy curable adhesive, said method comprising the steps of:

positioning a part and an adhering target at a prescribed relative position;

providing a coating device to coat plural sections between the part and the adhering target with light energy curable adhesive and coating the plural sections between the part and the adhering target with the light energy curable adhesive;

irradiating light energy through a light intensity changing filter to the light energy curable adhesive at one or more of the plural sections, the irradiated light energy being regulated by the light intensity changing filter;

generating a curing shrinkage force in the light energy curable adhesive at the one or more of the plural sections, said shrinkage force causing the part and the target to be relatively displaced from each other;

changing, with the light intensity changing filter, an intensity of the irradiated light such that the light energy curable adhesive at the one or more of the plural sections experiences a change in irradiation energy when the part and the target are relatively displaced from each other in the course of shrinkage of the light energy curable adhesive so that at least one of the curing shrinkage forces are changed and stresses generated by the curing shrinkage forces are offset, the irradiation energy being changed by an irradiation control device by turning on and off a light energy irradiation device irradiating the light energy; and adhering the part to the adhering target while maintaining the part and target at the prescribed position, wherein said curing shrinkage forces are adjusted to be even by selectively irradiating the light energy to the light energy curable adhesive at at least one of the plural sections so that one of an amount and a direction of at least one of the stresses can be changed to be offset.

2. The method of claim 1, further comprising providing a position detecting device to detect a relative position between the part and the adhering target, and detect displacement of the part from the adhering target.

3. The method of claim 2, further comprising providing a feedback device to feed back detection results from the position detecting device to the irradiation control device.

4. The method of claim 2, further comprising providing an irradiation area changing device including a mask to adjust an irradiation area to which the light energy is applied.

* * * * *